United States Patent [19]

Ilon

[11] 4,388,754
[45] Jun. 21, 1983

[54] SKID PROTECTION DEVICE FOR WHEELS

[76] Inventor: Bengt E. Ilon, Pilatusstr. 16, Meggen-Luzern, Switzerland, 6045

[21] Appl. No.: 316,392

[22] Filed: Oct. 29, 1981

[30] Foreign Application Priority Data

Oct. 29, 1980 [CH] Switzerland ........................ 8007589

[51] Int. Cl.³ ..................... B23P 11/02; B60C 27/14; B60C 27/06
[52] U.S. Cl. ................................. 29/446; 152/213 R; 152/216; 152/217; 152/241; 152/223
[58] Field of Search ............... 152/213 R, 213 A, 216, 152/217, 219, 225 R, 241, 214, 223, 218; 81/15.8; 29/446, 433

[56] References Cited

U.S. PATENT DOCUMENTS

| 2,912,036 | 11/1959 | Minutilla | 152/225 R |
| 3,861,752 | 1/1975 | Thurre et al. | 152/216 |
| 3,895,664 | 7/1975 | Muller | 152/225 R |
| 4,146,075 | 3/1979 | Riedel | 152/225 R |

FOREIGN PATENT DOCUMENTS

| 733798 | 5/1966 | Canada | 152/213 R |
| 2250955 | 5/1973 | Fed. Rep. of Germany | 152/225 R |
| 2400870 | 8/1974 | Fed. Rep. of Germany | 152/22 R |
| 2327111 | 10/1977 | Fed. Rep. of Germany | 152/225 R |
| 1520579 | 4/1968 | France | 152/216 |
| 556251 | 11/1974 | Switzerland | 152/225 R |

Primary Examiner—Edward C. Kimlin
Assistant Examiner—F. K. Wine
Attorney, Agent, or Firm—John J. Dennemeyer

[57] ABSTRACT

The present invention relates to a skid protections device (3) for wheels preferably snow chains for vehicle wheels. In order to permit quick and simple assembly of snow chains on vehicle wheels the device according to the invention comprises a power aggregate attached to a wheel, coupled to a bracket thereon. The bracket with skid protection means may be mounted at the wheel with the skid protection means extending in working position around the wheel except a part thereof which is prevented from attaching a working position by the wheel engaging a ground. The power aggregate, in coupled condition, moves the blocked part of the skid protection means to the working position when it is released by rotation of the wheel, the skid protection means in working position is movable in peripheral direction relative to the wheel during rotation.

24 Claims, 7 Drawing Figures

SKID PROTECTION DEVICE FOR WHEELS

BACKGROUND OF THE INVENTION

The present invention relates to a skid protection device for wheels, preferably snow chains for vehicle wheels.

Mounting snow chains on vehicle wheels is often a dirty and time-consuming operation which often must be performed under severe conditions outdoors.

OBJECT AND SUMMARY OF THE INVENTION

The object of the present invention is to eliminate this problem by simple means the features of which are defined below.

BRIEF DESCRIPTION OF THE DRAWINGS

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The invention will be further described below with reference to the accompanying drawings, in which.

DETAILED DESCRIPTION OF THE PREFERRED EMBODIMENT

Figure 1:
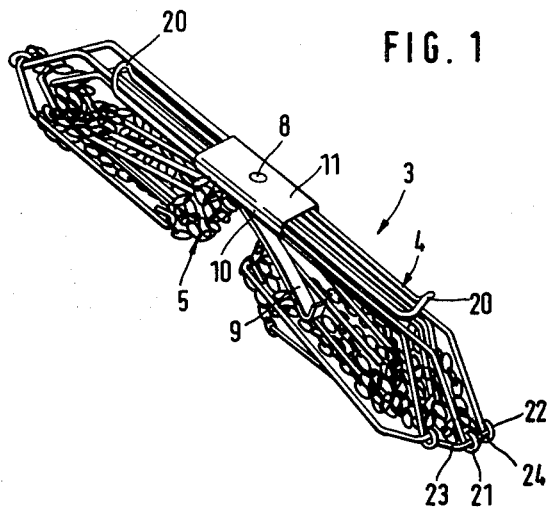
FIG. 1 is a perspective view illustrating a folded skid protection forming part of the device according to the invention.
Figure 2:
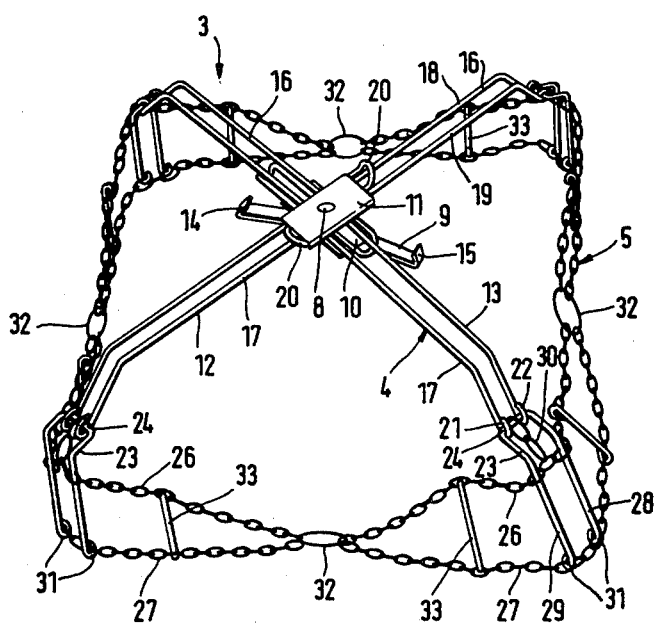
FIG. 2 is a perspective view showing the unfolded skid protection ready for assembly.
Figure 3:
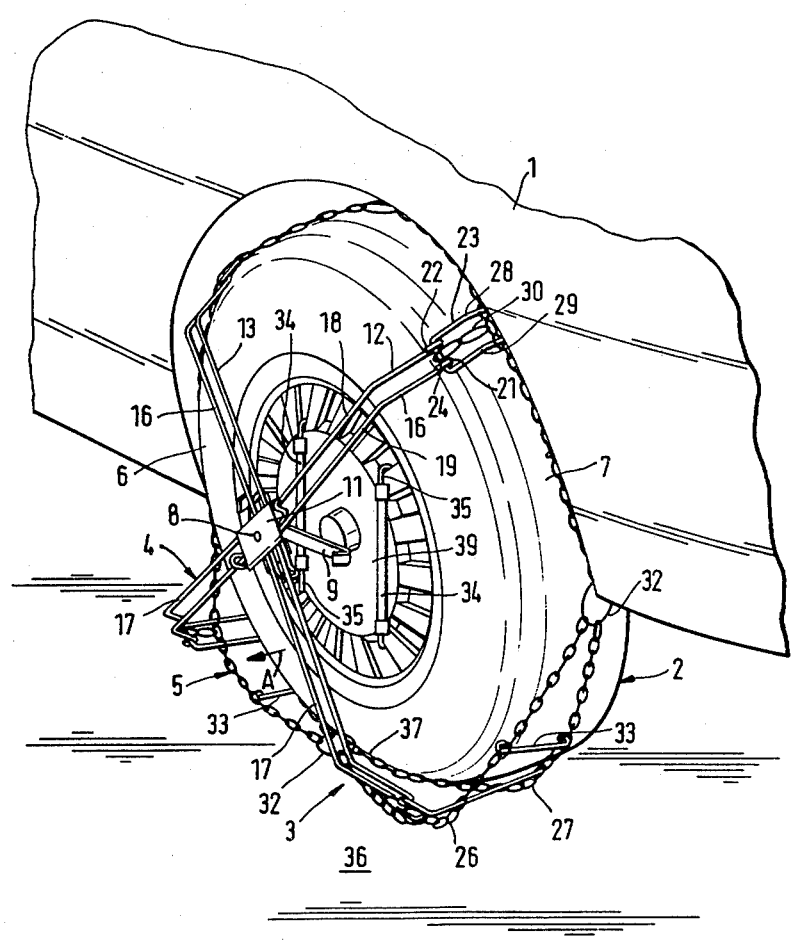
FIG. 3 is a perspective view showing the skid protection placed beside a car wheel.

Turning first to FIG. 3, there is illustrated a part of a car 1 with a wheel 2 which is to be provided with a skid protection device 3. The skid protection device comprises a bracket 4 with skid protection means in the form of a snow chain 5 which is to be put around the periphery of the wheel 2, more particularly, the tread surface 7 of the tire 6. As best seen in FIGS. 1 and 2, the bracket 4 pivots about an axis 8 on which a coupling member 9 and two retaining elements 10 and 11 are pivotally mounted. The retaining elements 10, 11 are provided with slots for arms 12 and 13 of the bracket 4. The retaining elements 10, 11 are mounted on the axis 8 with the slots provided on the retaining means facing each other. The coupling member 9 may be in the form of a longitudinal rod, the end portions of which are bent towards each other to provide substantially U-shaped hook portions 14 and 15. Likewise, the opposite edge portions of retaining elements 10, 11 may be bent such that these elements, become U-shaped. Each arm 12, 13 comprises two yokes 16 and 17, which extend through the slots in the retaining elements 10 or 11 and extend from the retaining elements 10 or 11 in opposite directions. Each yoke 16, 17 is preferably made of a U-shaped element the shanks 18, 19 of which extend on opposite sides of the axis 8. One end portion 20 at which the shanks 18, 19 are connected to each other, is bent to form a stop to limit the extension of the yokes 16 and 17 respectively by ramming into the edge of the retaining elements 10 and 11 respectively. The free shank end portions of the yokes 16 and 17 respectively, are bent to provide gripping portions 21 and 22 respectively, which engage a U-shaped fastening portion 23, at the web or base portion 24 thereof, in such a way that the fastening portion is pivotable around a pivot axis extending transversely to the yoke 16 and 17 respectively.

The snow chain 5 has a first link portion 26, the links of which are arranged on the fastening portion 23 closest to the yoke 16 and 17 respectively, and a link portion 27 the links of which are arranged on the outer end of the fastening portion 23. The links of the first link portion 26 are preferably threaded on the separater shanks 28, 29 of the fastening portion 23 and fastened by means of one or more fastening links 30 of which one is threaded on the web or base portion 24. The links of the second link portion 27 are threaded through eyes 31 formed by bending the separate shanks 28, 29. By varying the number of fastening links 30 between the web portion 24 and the first link portion 26, the distance between the first and second link portions 26, 27 at the fastening portion 23 and thus, the diameter of the entire chain 5, may be altered for quickly adjusting the chain to the diameter of the wheel 2.

The distance between the first and second link portions 26, 27 of the chain 5 decreases on opposite sides of the fastening portion 23 and said link portions are mounted in rings 32 positioned approximately half-way between the fastening portions 23. These rings 32 form the narrowest parts of the chain and the first and second link portions 26, 27 are preferably connected to each other via transverse rods 33 positioned approximately half-way between the fastening portions 23 and the rings 32. This construction of the chain 5 facilitates the assembly thereof on the wheel 2 and provides a firm "grip" on the surface.

As is evident from FIG. 1, the skid protection device may be folded to a very small "package" by pivoting the arms 12, 13 such that they extend parallel to each other, pushing the yokes 16, 17 together as far as possible the yokes 16, 17 forming the arms 12, 13, folding the fastening portions 23, inwards and putting together the chain 5 in a suitable manner. When the skid protection device 3 is to be mounted, the arms 12, 13 are pivoted set such that they form a cross and the yokes 16, 17 are extended as far as possible (see FIG. 2). Thereby, the skid protection device 3 is ready for assembly on the wheel 2. The wheel 2 is provided with two rubber straps 34 having hooked end portions 35 which hook the straps to the wheel rim 39.

Figure 4:
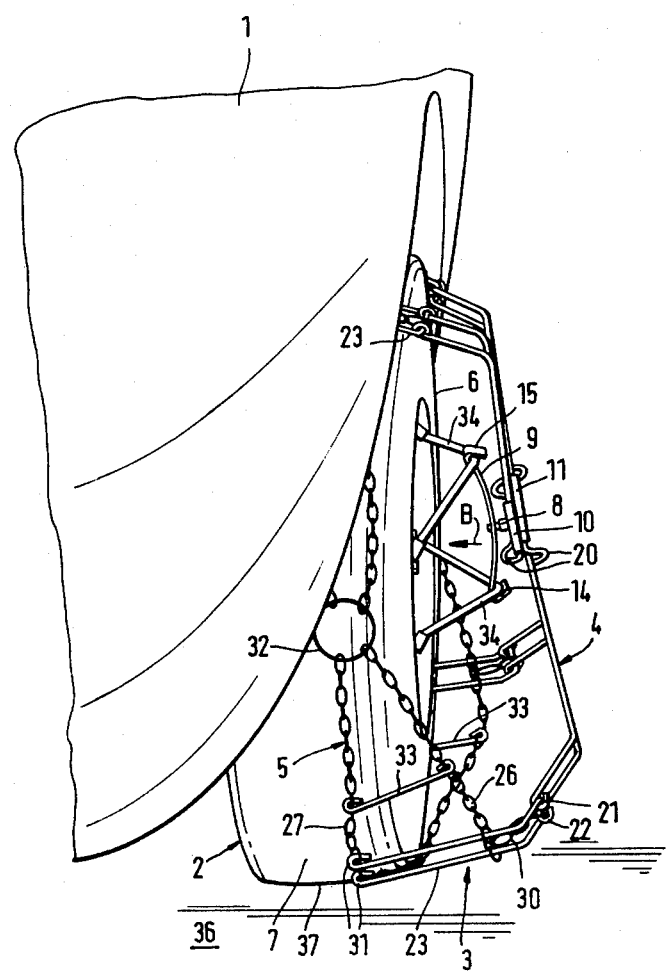
FIG. 4 is a front view of the skid protection positioned at the car wheel for assembly.
Figure 5:
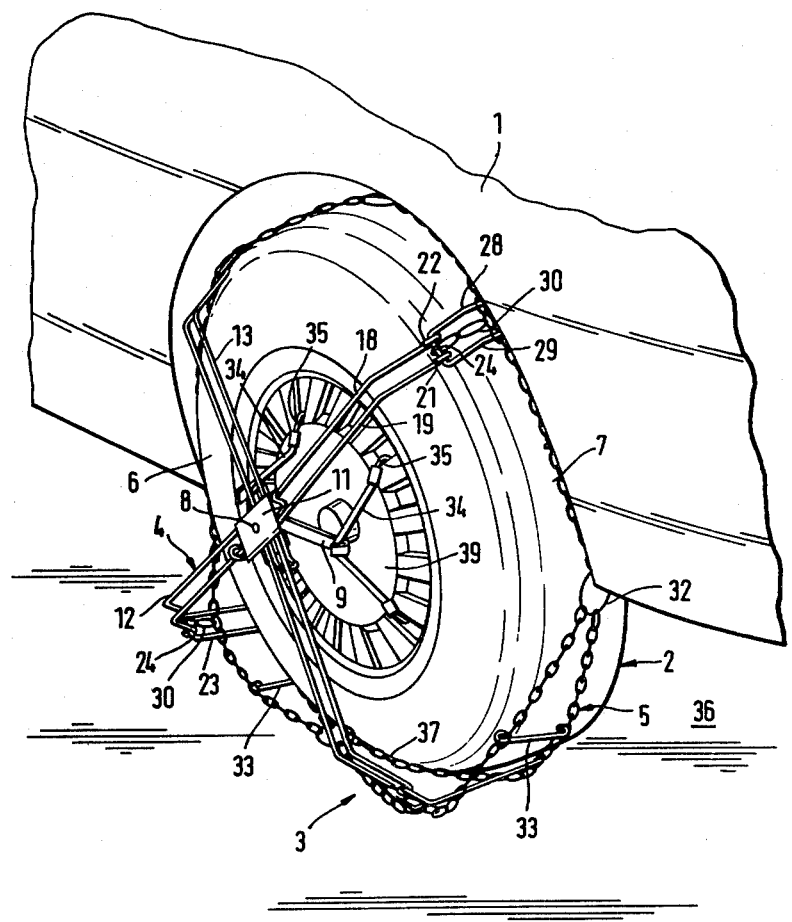
FIG. 5 is a perspective view of the device of FIG. 4.

As shown in FIG. 4, the rubber straps 34 are hooked preferably such that they are somewhat stretched into tension and the skid protection 3 is then placed close to the wheel 2, with one of the narrowest parts (a ring 32) of the chain 5 beside the portion 37 of the tire 6 engaging the ground 36. The chain is thereby brought around the wheel such that it reaches its working position on the tread surface 7 of the wheel 2 at the upper parts thereof. While the chain 5 lies beside the portion of the wheel 37 engaging the ground 36 with one of its narrowest parts (the ring 32), only a minor portion of the links of the chain 5 will be prevented from reaching their working positions on the tire 6.

In this position, the skid protection device 3 slopes downwardly relative to the wheel 2 and may, in this position, be connected to the wheel by means of the rubber straps 34. To enable this connection, the rubber straps 34 are stretched in the direction of arrow A, FIG. 3 and hooked onto the hook portions 14, 15 of the coupling member 9. The rubber straps 34 are dimensioned so that they exert such a large force, shown by arrow B, of FIG. 4, on the skid protection 3 in the direction of the wheel 2, that said straps, through the arms 12, 13, displace the portions of the chain 5 not yet in working position to their working positions when the wheel rotates. In other words, one must only place the skid protection 3 close to the wheel 2, as is shown in FIGS. 3 and 4, connect it to the wheel with the rubber straps 34, as is shown in FIG. 4, and drive away in the car, whereby the rubber straps automatically draw the skid protection device in position on the wheel 2, since the portions of the chain 5 initially lying beside the tire 6 may slide in over the tread surface 7 as soon as these portions are free. As a matter of fact, the wheel 2 need only to rotate partially before said portions of the chain 5 become free by rotating with the wheel and leaving the hindrance constituted by the ground in order to be brought into working position.

The rubber straps 34 are designed preferably such that they also exert a force on the skid protection device in the direction indicated by arrow B when the skid protection in its working position on the wheel, whereby said straps efficiently retain the skid protection especially when the chain 5 is provided to move around the wheel. This is essential in many cases, because the chain 5 may have a larger diameter than the wheel and thus, a different velocity than the wheel during rotation thereof. Furthermore, the force on the rubber straps 34 in the direction indicated by arrow B increases the more the skid protection device 3 or portions thereof are forced out of working position in the direction arrow A indicated by during driving.

Figure 6:
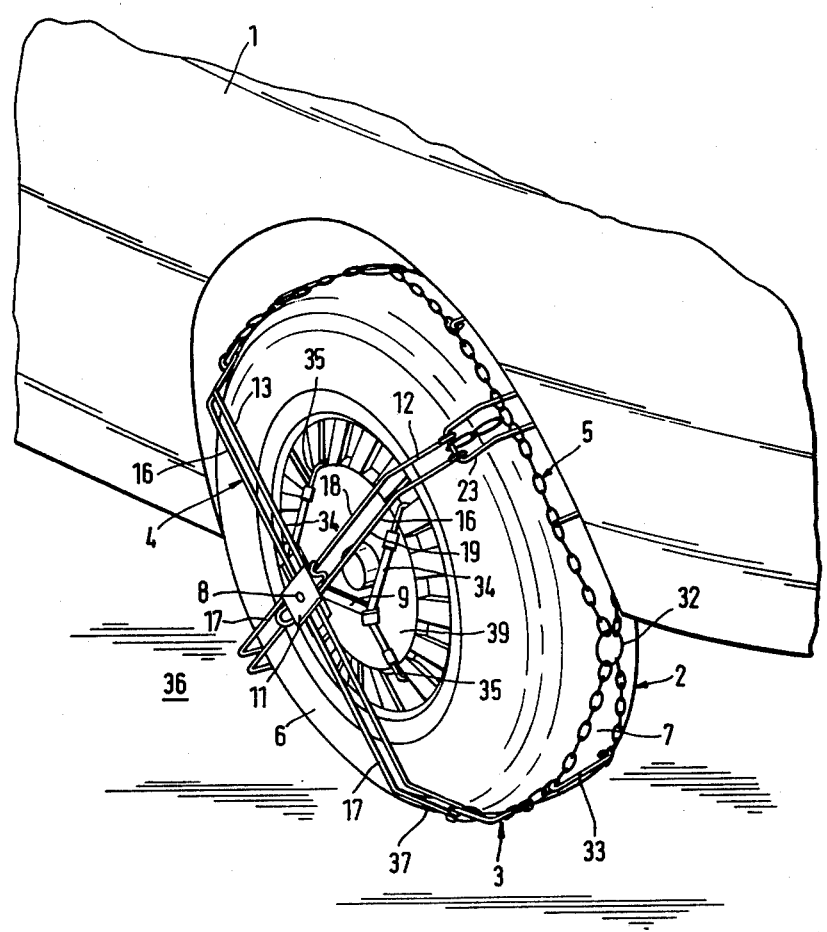
FIG. 6 illustrates the skid protection mounted on the car wheel.
Figure 7:
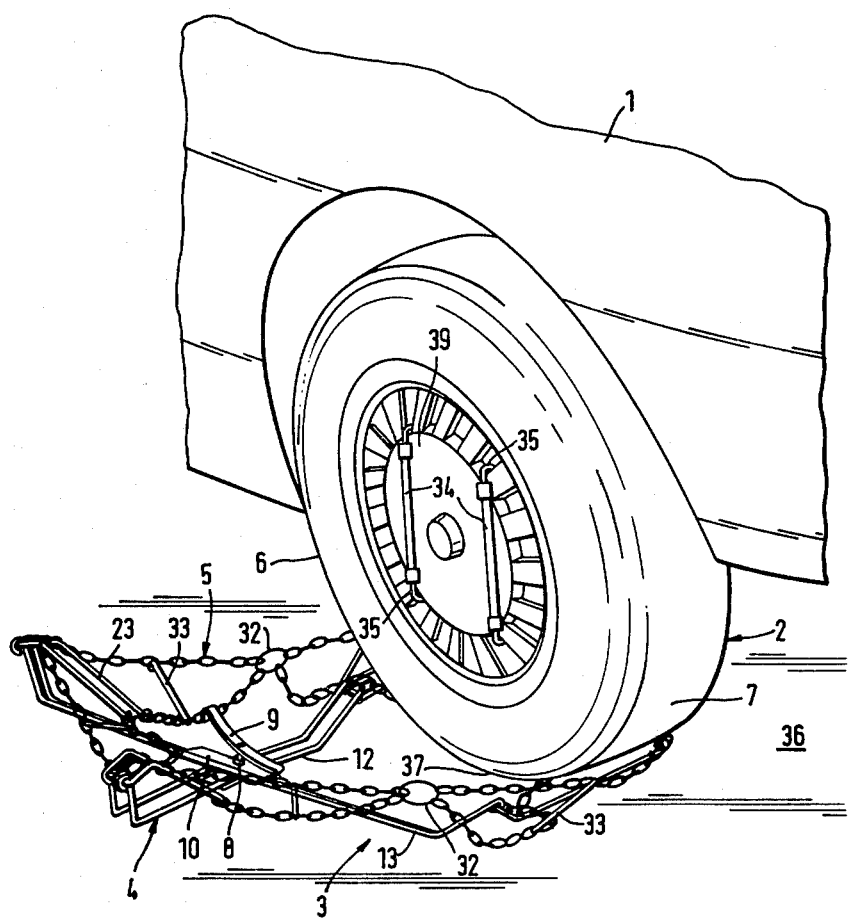
FIG. 7 illustrates the skid protection after disassembly from the car wheel.

Removal of the skid protection 3 from the wheel 2 is as simple as the mounting. As best seen in FIGS. 6 and 7, this is done by releasing the coupling member 9 from the rubber straps 34 and thereafter pulling the chain 5 away from the upper parts of the wheel 2. While the fastening portions 23 are pivotally connected to the arms 12, 13 the skid protection 3 may be brought down (see FIG. 7) without damaging any fastening portions 23 or the arms 12, 13 under the wheel 2. Thereafter the car is driven forward or backward a small distance until the skid protection 3 is completely free and may be picked up, folded and stored in the luggage compartment in the car.

The embodiment described and shown in the drawings is only one of many alternatives of the present invention. Thus the skid protection may be of another type than a snow chain and it is also possible to use skid protections comprising several individual parts. The skid protection may be used for wheels other than vehicle wheels, whereby the parts forming the device may vary in number and shape. Another type of retaining device other than rubber straps 34 may, for example be used for applying forces on the skid protection device and the retaining device may be arranged in a different member than the straps 34, for example, the coupling member 9 maybe connected directly to the wheel, while the retaining device is positioned on the outside of the coupling member. The retaining device may be integral with the skid protection device 3 and may comprise one or more members and it may have power generating means of various types, e.g. elastic straps of another material than rubber, for example, leaf springs. coil springs and gas springs. Also, the bracket 4 and other members of the skid protection may be formed in various ways but still be useful within the scope of the present invention.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A skid protection device adapted to be mounted to a wheel carrying a tire comprising: a skid protection device adapted to engage a periphery of the tire, a resilient force applying device releasably secured to said wheel; a coupling member connected to said skid protection device and adapted to be engaged and energized by said force applying device to permit application of said protection device from a side of said wheel;

whereby during installation on said wheel, said protection device engages a periphery of said tire except for a ground engaging portion of said periphery and whereby said force applying device and said coupling member cooperate when assembled to bias said skid protection device in an axial direction toward said wheel whereby said protection device moves axially toward said wheel to engage said ground engaging portion during rotation of said wheel.

2. The device as set forth in claim 1, wherein said skid protection device further comprises:
  (a) radial arms having substantially U-shaped outer members for engaging said tire, said outer members having a base portion pivotally attached to an end of said arms; and
  (b) a first and second chains attached to said outer members, said first and second chains being in spaced relation to one another.

3. The device of claim 2 wherein said radial arms pivot about an axis and further comprising:
  (a) said coupling member being pivotally arranged on said axis;
  (b) a pair of retaining elements pivotally arranged on said axis;
  (c) said radial arms being retained in said retaining elements whereby they are pivotable about said axis.

4. The device of claim 3, wherein said radial arms each include a yoke, said yokes being movable in said retaining elements.

5. The device of claim 4 wherein said yokes are substantially U-shaped rods having shanks; said shanks being positioned about said axis whereby the shank of one yoke nests between the shank of the other yoke.

6. The device of claim 5 wherein:

(a) said first and second chains are variably spaced from one another forming narrow spaced portions and wider spaced portions;
(b) ring means for joining said narrow portions together;
(c) rods for transversely connecting said first and second chains together remote from said narrow portions; whereby
said narrow portions alternate with said wider portions, and said wider portions being retained by said outer members.

7. The device of claim 6 further comprising fastening links, said fastening links being attached to said first chain at said wider portion and to said outer members substantially at the bases thereof.

8. The device defined in claim 2 wherein said resilient force applying device comprises stretched spring elements mounted to said wheel.

9. The device defined in claim 2 wherein said resilient force applying device is a rubber strap.

10. The device defined in claim 9 wherein a plurality of straps are provided.

11. The device according to claim 10, wherein skid protection elements of the skid protection device are positioned along said peripheral portion of the wheel during a rotation thereof.

12. The device according to claim 11, wherein the resilient force applying device is mounted on a side of the wheel facing outwardly away from an associated vehicle and that the skid protection device is axially restrained by the resilient force applying device.

13. The device according to claim 12, wherein the skid protection device comprises a pair of radial arms having associated outer members for holding the skid protection elements and adapted to extend radially about the peripheral portion of the wheel, whereby during installation on said wheel at least one of said outer members is positioned on either side of said ground engaing portion of said tire.

14. The device according to claim 13, wherein said resilient force applying device is operable to retract the skid protection means into a working position and to retain said skid protection means in said working position.

15. The device according to claim 14, wherein the skid protection elements are journalled between said outer members of said arms and are positioned generally surrounding the peripheral portion of the wheel.

16. The device according to claim 15, wherein the resilient force applying device comprises at least one spring element adapted to be connected to an outer side of a rim of the wheel and which, when coupled to said coupling member of said skid protection device, is tensioned axially away from said wheel, whereby said at least one spring element biases the skid protection device against the wheel.

17. The device according to claim 16, wherein the at least one spring element comprises an elastic band having catches for engaging the rim of said wheel.

18. The device according to claim 13, wherein said protection device further comprises a pivotable bracket for holding said arms and for pivotally connecting said arms about an axis whereby the arms may be rotated about said axis to a collapsed generally stacked position for storage or pivoted about said axis to a generally perpendicular position for use.

19. The device according to claim 18, wherein said arms have associated retaining elements thereon and associated movable yokes and wherein the bracket is mounted on said axis and said retaining elements are journalled through said brackets, and wherein said yokes are movably disposed in said retaining elements and displaceable relative to each other.

20. The device according to claim 19, wherein each arm further has an associated shank and wherein each yoke is U-shaped, and the shanks thereof extend on opposide sides of said axis and whereby one shank and its associated yoke defines an arm.

21. A method of applying a skid protection device to a wheel having a tire mounted thereon, comprising:
positioning a resilient axial force applying device to the wheel;
arranging a skid protection device about a periphery of the tire except for a ground engaging portion of said periphery;
engaging a coupling member associated with said skid protection device with said resilient axial force applying means to hold said protection device against said wheel and about said tire and to apply an axial bias force to said coupling member whereby when said wheel rotates, said protection device automatically engages said ground engaging portion of said tire periphery.

22. The method of claim 21, wherein the step of applying said resilient axial force applying device further comprises removably attaching at least one rubber strap to said wheel.

23. The method of claim 22, wherein the step of arranging a skid protection device further comprises:
providing a chain device adapted to fit around said tire periphery, said chain device being fastened onto outer members which engage said tire and which are associated with telescoping arms which pivot about an axis; pivoting said arms into a working position;
telescoping said arms to adapt said chain device to a size of said tire; positioning said outer member about a periphery of said tire whereby said chain device assumes a position along said tire periphery except for a road engaging portion of said periphery.

24. The method of claim 22, wherein said coupling member is journalled on said axis and further including the step of tensioning said at least one resilient strap to engage said coupling means and releasing said tension to bias said coupling member axially toward said wheel.

* * * * *